United States Patent [19]

Takahashi et al.

[11] Patent Number: 4,810,564

[45] Date of Patent: Mar. 7, 1989

[54] ELASTOMER ROLL HAVING A FIRST LAYER OF AN ORGANOPOLYSILOXANE COMPOSITION AND A SECOND THIN LAYER OF A FLUORINE RESIN

[75] Inventors: Masaharu Takahashi, Annaka; Keiji Take, Takasaki; Takeo Yoshida, Annaka, all of Japan

[73] Assignee: Shin-Etsu Chemical Co., Ltd., Japan

[21] Appl. No.: 153,402

[22] Filed: Feb. 8, 1988

[30] Foreign Application Priority Data

Feb. 9, 1987 [JP] Japan .................................. 62-27544

[51] Int. Cl.$^4$ ............................................ B21B 31/08
[52] U.S. Cl. ..................................... 428/213; 29/132; 355/3 FU; 428/220; 428/329; 428/331; 428/421; 428/422; 428/447; 428/448; 428/450; 432/60
[58] Field of Search .................... 29/132; 355/3 FU; 432/60; 428/36, 220, 421, 422, 447, 448, 450, 329, 331, 213

[56] References Cited

U.S. PATENT DOCUMENTS

| | | | |
|---|---|---|---|
| 3,795,033 | 3/1974 | Donnelly et al. | 29/132 |
| 4,074,001 | 2/1978 | Imai et al. | 29/132 |
| 4,083,092 | 4/1978 | Imperial et al. | 29/132 |
| 4,198,739 | 4/1980 | Budinger et al. | 29/132 |
| 4,430,406 | 2/1984 | Newkirk et al. | 29/132 |
| 4,522,866 | 6/1985 | Nishikawa et al. | 29/132 |
| 4,719,130 | 1/1988 | Shimizu et al. | 29/132 |

FOREIGN PATENT DOCUMENTS

| | | |
|---|---|---|
| 0186314 | 7/1986 | European Pat. Off. . |
| 3606662 | 9/1986 | Fed. Rep. of Germany . |
| 866998 | 5/1961 | United Kingdom . |
| 2151187 | 7/1985 | United Kingdom . |

Primary Examiner—Ellis P. Robinson
Assistant Examiner—James J. Seidleck
Attorney, Agent, or Firm—Lowe, Price, LeBlanc, Becker & Shur

[57] ABSTRACT

An elastomer roll comprising a roll core, a first layer of a cured organopolysiloxane composition, and a second thin layer of a fluorine resin formed in this order. The organopolysiloxane composition is comprised of an organopolysiloxane, a finely divided silica filler, an organosilicon material having at least one hydrogen atom bonded to the silicon atom in one molecule, iron oxide, a fluorine resin, and an organic peroxide in defined amounts.

9 Claims, No Drawings

ELASTOMER ROLL HAVING A FIRST LAYER OF AN ORGANOPOLYSILOXANE COMPOSITION AND A SECOND THIN LAYER OF A FLUORINE RESIN

BACKGROUND OF THE INVENTION

1. Field of the Invention

This invention relates to rolls and more particularly, to elastomer rolls which are resistant to heat and have good releasing properties and are thus useful particularly as a fixing roll of electrostatic duplicators and the like apparatus.

2. Description of the Prior Art

In an electrostatic duplicating system where a toner image formed on a paper sheet is fixed, the toner image-bearing paper sheet is passed between two rolls contacted under pressure. One or both of the rolls are ordinarily heat rolls which are arranged to be heated from the inside. The fixing system using the heat roll or rolls is higher in heat efficiency than other systems using, for example, an oven. Thus, the heat roll fixing system is more advantageous in that high speed duplicating operations are readily realized. From this point of view, recent electrostatic duplicators have adopted this manner of fixing.

The rolls used in the fixing method are ordinarily comprised of a core bar of a metal such as aluminum, stainless steel, iron and the like, an elastic rubber layer formed on the core metal and made, for example, of fluorine rubber, silicone rubber or the like, and a fluorine resin layer formed as an upper most layer. The fluorine resin used for this purpose may be tertrafluorethylene-perfluoroalkoxyethylene copolymers (which may be hereinafter abbreviated as PFA), polytetrafluoroethylene resin (which may be hereinafter abbreviated as PTFE), a fluorinated ethylene propylene resin or tetrafluoroethylene-hexafluoropropylene resin (which may be hereinafter abbreviated as FEP) or the like. For the formation of the fluorine resin layer, it is necessary to heat the roll having the rubber layer at a temperature of from 300 to 400° C. for 30 minutes to 2 hours so that the fluorine resin is melted and adhered to the rubber layer. This will cause the underlayer of the rubber to thermally deteriorate and may result in an extreme lowering of the hardness of the rubber layer. If the fluorine resin is melt-adhered at a low temperature of not higher than 300° C. in order to avoid the above problem, the releasing properties of the fluorine resin layer becomes unsatisfactory. In addition, the adhesion between the rubber layer and the uppermost fluorine resin layer becomes so weak that the fluorine resin layer tends to peel off or blister at part or all of the surface of the roll in long use. Thus, the durability is not satisfactory.

SUMMARY OF THE INVENTION

It is accordingly an object of the invention to provide an elastomer roll which has a double-layer structure formed on a roll core and having good adhesion between two layers in the structure.

It is another object of the invention to provide an elastomer roll which comprises a first layer of an organopolysiloxane composition which is highly resistant to heat and a second layer of a fluorine resin whereby the fluorine resin layer can be formed at high temperatures sufficient for good adhesion to the first layer.

It is a further object of the invention to provide an elastomer roll which is substantially free of any separation between the first organopolysiloxane composition layer and the second fluorine resin layer over a long term when applied as a fixing roll of an electronic duplicator, ensuring a significantly prolonged life.

The elastomer roll according to the invention comprises a roll core, a first layer formed on the roll core, a second layer of a fluorine resin formed on the first layer. The first layer is comprised of a cured product of an organopolysiloxane composition which comprises: (1) 100 parts by weight of an organopolysiloxane having the following general average unit formula

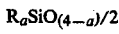

$R_aSiO_{(4-a)/2}$ in which each R is an unsubstituted or substituted hydrocarbon group, and a is a positive value of from 1.90 to 2.05; (2) from 5 to 300 parts by weight of a finely divided silica filler; (3) from 0.05 to 10 parts by weight of an organosilicon compound having at lest one hydrogen atom bonded or joined to the silicon atoms ($\equiv$SiH) in one molecule; (4) from 5 to 100 parts by weight of iron oxide; (5) from 0.5 to 100 parts by weight of a fluorine resin; and from 0.1 to 10 parts by weight of an organic peroxide for curing the composition. The cured product which has been formed on the outer surface of the roll core is highly resistant to heat. The heat resistance is so high that during the melt adhesion or coating of a fluorine resin at a high temperature of from 300° to 400° C., the cured product of the organopolysiloxane composition suffers little or no thermal deterioration, not causing the hardness to lower. When this type of roll is applied as a fixing roll of, for example, electronic duplicators and is used over a long term, no separation between the rubber layer and the fluorine resin layer takes place. This results in a significantly prolonged life of the roll.

DETAILED DESCRIPTION AND EMBODIMENTS OF THE INVENTION

The elastomer roll according to the invention has a roll core which is usually made of a metal such as aluminium, stainless steel, iron and the like although other materials may be used if desired. The roll core may have a desired diameter depending upon the purpose for the final roll.

In the practice of the invention, a first layer of a cured product of an oganopolysiloxane composition is formed about the roll core. The organopolysiloxane composition comprises six ingredients in defined ratios. The first ingredient is an organopolysiloxane having recurring units of the general formula, $R_aSiO_{(4-a)/2}$, in which R represents an unsubstituted or substituted monovalent hydrocarbon group and a represents a positive value of from 1.90 to 2.05. The monovalent hydrocarbon groups include, for example, an alkyl group having from 1 to 8 carbon atoms such as a methyl group, an ethyl group, a propyl group, a butyl group and the like, an alkenyl group having from 1 to 8 carbon atoms such as a vinyl group an allyl group, a butenyl group and the like, and an aryl group such as a phenyl group, a tolyl group and like. Further, these groups may be partly or wholly substituted with a halogen atom such as chlorine, bromine, iodine or fluorine, a cyano group, or the like. Specific examples of the substituted hydrocarbon groups include a chloromethyl group, a chloropropyl group, a 3,3,3-trifluoropropyl group, a 2-cyanoethyl group and the like. In the above formula, a is a positive value of from 1.90 to 2.05, and Rs may be the same or the different. The organopolysiloxane has preferably a linear molecular structure but may, more or less, contain a branched structure in the molecule. The organopolysiloxane used in the present invention should preferably be terminated at the ends of each molecule chain with end groups such as a triorganosilyl group or a hydroxyl group. Examples of the triorganosilyl group include a trimethylsilyl group, a dimethylvinylsilyl group, a methylphenylvinylsilyl group, a methyldiphenylsilyl group, a methyldivinylsilyl group, a trivinylsilyl group and the ike. The organopolysiloxane is not critical with respect to the degree of polymerization but should preferably have a viscosity of not less than 300 centistokes at 25° C.

The second ingredient is a finely divided silica filler which may be any silica filler ordinarily used in silicone rubbers for the purpose of reinforcement, thickening, improvement in workability and extension or filling. Such a filler may be fumed silica, wet silica, fumed or wet silica subjected to hydrophobic treatment on the surface thereof, fine quartz powder, diatomaceous earth powder, and the like. These powders should preferably have a specific surface area of not less than 1 m2/g. The size of the filler is preferably in the range of from 0.001 to 100 micrometers. The amount of the filler is generally in the range of from 5 to 300 parts by weight, preferably from 20 to 250 parts by weight, per 100 parts by weight of the organopolysiloxane. If the amount is less than 5 parts by weight, an intended reinforcing effect cannot be attained with unsatisfactory workability. On the other hand, over 300 parts by weight, the workability becomes poor and the heat resistance of the resultant rubber layer is not satisfactory.

The third ingredient used in the organopolysiloxane composition is an organosilicon compound having at least one hydrogen atom bonded to the silicon atom, i.e. a ≡SiH bond, in one moledule. This compound is used for the following reason. For the formation of a fluorine resin surface layer on the silicone rubber layer, it is preferably to heat a fluorine resin at a high temperature of from 300° to 400° C. for 30 minutes to 2 hours. During the heating, the silicone rubber layer will thermally deteriorate and lower in hardness. This can be prevented by the addition of the organosilicon compound, by which when the roll is used as a fixing roller, a long time use is ensured. The organosilicon compound is preferably linear or cyclic in structure but may contain a small amount of a branched chain structure or a three-dimensional structure. Examples of the organosilicon compounds useful in the present invention include methylhydrogenpolysiloxanes blocked with a trialkylsilyl group at terminal ends thereof and having a wide range in degree of polymerization, siloxane copolymers consisting of pentasiloxane of the formula, Si[O-Si(CH3)2H]4, SiO2 units and (CH3)2HSiO0.5 units, copolymers of methylhydrogenpolysiloxane and a dialkylsiloxane, polysilylaklylenesiloxanes having SiH bonds, polysilanes, polycarbosilanes, and the like. The organosilicon compounds or materials are used in an amount of from 0.05 to 10 parts by weight per 100 parts by weight of the first organopolysiloxane ingredient. This is because when the amount is less than 0.05 parts by weight, an intended heat resistance cannot be obtained, whereas over 10 parts by weight, the heat resistance tends to lower.

The fourth ingredient is iron oxide which can impart a heat resistance to the cured silicone rubber layer. The iron oxide may be red oxide, black oxide of iron and the like. The oxide powder should preferably have a size not larger than 50 micrometers. The amount of the oxide powder is generally in the range of from 5 to 100 parts by weight per 100 parts by weight of the organopolysiloxane. If the amount is less than 5 parts by weight, the heat resistance is not improved satisfactorily. On the contrary, when the amount exceeds 100 parts by weight, the workability of the resultant composition lowers with a lowering of physical properties of the cured silicone rubber composition.

The fifth ingredient used in the composition is a fluorine resin which improves adhesion to a fluorine resin layer formed on the surface of the silicone rubber layer formed from the composition, thereby keeping the good adhesion between the layers over a long term. The fluorine resin used for this purpose may be tetrafluoroethylene-perfluoroalkoxyethylene copolymers, tetrafluoroethylene resins, tetrafluoroethylene-hexafluoropropylene copolymers or fluorinated ethylene and propylene resins, and and the like. These fluorine resins should preferably have a degree of polymerization of from 100 to 10,000. Useful fluororesins are commercially available, for example, under the designations of Lubron L-2 and L05 from Daikin Ind. Co., Ltd., and Teflon 6C-J, M-10 and M-10-2 from Mitsui Fluorochemical Co., Ltc. The amount of the fluorine resin is generally in the range of from 0.5 to 100 parts by weight per 100 parts by weight of the first organopolysiloxane ingredient. When the amount is less than 0.5 parts by weight, the adhesion to the fluorine resin layer becomes unsatisfactory, whereas over 100 parts by weight, the workability of the resultant composition lowers with increasing costs.

The sixth ingredient contained in the composition is an organic peroxide which serves as a curing agent for the composition. The organic peroxides may be any compounds ordinarily employed for thermally during silicone rubbers and include, for example, benzoyl peroxide, 2,4-dichlorbenzoyl peroxide, di-t-butyl peroxide, dicumyl peroxide, t-butyl perbenzoate, t-butyl peracetate, 2,5-t-butyl peroxyhexane, t-butyl peroxyisopropylcarbonate, organosilyl peroxide, and the like. The amount of the organic peroxide is generally in the range of from 0.1 to 10 parts by weight per 100 parts by weight of the organopolysiloxane used as the first ingredient. This is because when the amount is less than 0.1 part by weight, curing may not proceed satisfactorily. Over 10 parts by weight, the resultant composition is not favorable in curing characteristics from the standpoint of handling and the silicone rubber obtained from the composition lowers in physical properties.

The organopolysiloxane composition used to form the cured silicone rubber layer is obtained by uniformly mixing the above-described first to sixth ingredients in predetermined amounts such as in a kneader, a three-roll mill, a two-roll mill or a banbury mixer. The composition may further comprise a dispersant such as a low molecular weight siloxane having a silanol group at both ends of the molecule chain, a heat-resistant improver, a flame retarder, and the like.

The uniform organopolysiloxane composition is first applied as a layer to be wound about a metal core of a roll form and thermally cured on the metal core. To this end, the composition is applied and press molded on the metal core, followed by thermally curing at a suitable temperature of, for example, 170° C. for several minutes. Subsequently, the silicone rubber roll is postcured, for example, at 200° C. for 4 hours. For general purposes, the thickness of the cured product layer may be in the range of from 0.3 to 20 mm. As a matter of course, a primer layer may be formed on the core so as to improve the adhesion to the organopolysiloxane composition. Such a primer may be carbon functional silanes, silazanes or the like and is available from Shinetsu Chemical Co., Ltd. under the designations of Primer Nos. 16, 18b and 19.

The silicone rubber roll obtained in the manner described above is further formed thereon with a fluorine resin layer by fusion so as to improve releasing properties of the roll. The fluorine resins used for this purpose may be those used in the organopolysiloxane composition as the fifth ingredient, i.e. tetrafluoroethylene-perfluoroalkoxyethylene copolymers, tetrafluoroethylene resins, tetrafluoroethylene-hexafluoropropylene copolymers or fluorinated ethylene and propylene resins, and and the like. The fluorine resin layer is formed by applying a fluorine resin in the form of a powder, paste or dispersion onto the substantially entire outer surface of the silicone rubber layer and subjecting to thermal treatment at 300 to 400° C. for 30 minutes to 2 hours. By this treatment, the fluorine resin is strongly adhered to the silicone rubber layer by fusion. This fluorine resin layer is not formed as thick and has generally a thickness of from 5 to 100 micrometers.

The final elastomer roller has thus a double-layer structure of the silicone rubber layer and the fluorine resin layer. The silicone rubber layer is made of a cured product of an organopolysiloxane composition having a specific formulation and has good physical properties, e.g. a hardness of 40 to 75 (as determined by the JIS standards), a tensile strength of 4 kgf/cm2 or higher, and an elongation of 10 to 300%. In addition, the silicone rubber layer undergoes only a small variation in hardness of not larger than −10 points when determined after heating at 350° C. for 1 hour. Accordingly, the silicone rubber layer suffers little deterioration when bonded with a fluorine resin melt. Since the organosiloxane composition contains a fluorine resin therein, a good adhesion to the fluorine resin layer is ensured. The fluorine resin layer does not separate from the silicone rubber layer over a long term, so that the elastomer roll involves little lowering in properties and is thus particularly useful as a fixing roll of electrostatic duplicators. This leads to a remarkably increasing number of copies per fixing roll.

The present invention is more particularly described by way of examples, in which parts are by weight and viscosities are values measured at 25° C.

EXAMPLE 1

Comparative Examples 1-3

100 parts of methylvinylpolysiloxane blocked with a trimethylsiloxy group at both ends, consisting of 99.6 mole% of dimethylsiloxane units and 0.4 mole% of vinylmethylsiloxane units and having a viscosity of 5,000,000 centistokes were mixed sufficiently with 45 parts of fumed silica having a specific surface area of 200 m2/g and 5 parts of diphenylsilanediol by means of two rolls, kneaded in a kneader mixer, and thermally treated at 170° C. for 3 hours, followed by cooling to obtain mixture A.

To 100 parts of the mixture A were added methylhydrogenpolysiloxane blocked with a trimethylsilyl group at both ends and having 1.6 moles/100 g of ≡SiH group, iron oxide (Bengara SR-570 available from Toda Ind. Co., Ltd.), a fluorine resin (Lubron L-2), and dicumyl peroxide in amounts indicated in Table 1, respectively. The resultant mixture was passed three times, through a three-roll mill for kneading, thereby obtaining organopolysiloxane composition I. This composition I was applied onto a stainless steel core bar having a diameter of 50 mm through a primer in a thickness of 0.8 mm in the form of a roll. Subsequently, the applied composition was press molded at 170° C. for 10 minutes and postcured at 200° C. for 4 hours to obtain a silicone rubber roll.

Thereafter, the roll was polished with a whetstone on the surface thereof and uniformly sprayed with a tetrafluoroethylene resin dispersion (D-1 available from Daikin Co., Ltd.) in a dry thickness of 30 micrometers. The sprayed roll was dried at room temperature for 4 hours and thermally treated at 350° C. for 1 hour to permit the fluorine resin to be thermally bonded to the silicone rubber layer. In this manner, elastomer rolls were obtained.

The thus obtained elastomer rolls were subjected to measurement of dry physical properties and physical properties after thermal treatment of 350° C. and 1 hour. The results are shown in Table 1. Moreover, when the rolls were employed as fixing rolls of an electrostatic duplicator under conditions of a roll contact pressure of 60 kgf and a peripheral speed of 350 mm/second for a copying test, in which A-4 type paper sheets were passed at a rate of 50 sheets/minute. As a result, 1,00,000 copies or more were obtained without involving any troubles.

For comparison, compositions II, III and IV were prepared except that the organopolysiloxane, iron oxide or fluorine resin was not used in the organopolysiloxane composition I, respectively. These compositions were treated in the same manner as described above, thereby obtaining elastomer rolls. These rolls were also subjected to the measurement of physical properties and used as a fixing roller for the copying test. The results of the comparison test are also shown in Table 1 below.

TABLE 1

| | Example | Comparative Example | | |
|---|---|---|---|---|
| | 1 | 1 | 2 | 3 |
| Composition No. | I | II | III | IV |
| Composition: | | | | |
| Mixture A | 100 | 100 | 100 | 100 |
| Methylhydrogen-polysiloxane | 0.5 | — | 0.5 | 0.5 |
| Iron oxide | 5 | 5 | — | 5 |
| Fluorine resin | 50 | 50 | 50 | — |
| Dicumyl peroxide | 0.6 | 0.6 | 0.6 | 0.6 |
| Dry Physical Properties: | | | | |
| Hardness (JIS) | 60 | 63 | 61 | 60 |
| Tensile strength (kg/cm$^2$) | 73 | 70 | 75 | 78 |
| Elongation (%) | 183 | 175 | 177 | 192 |
| Physical Properties After Heat Treatment: | | | | |
| Variation in hardness (point) | −4 | −21 | −32 | −4 |
| Residual tensile strength (%) | 53 | 25 | 12 | 58 |
| Residual elongation (%) | 60 | 70 | 60 | 63 |

With respect to the copying test, the rolls of Example 1 passed a test of 1,00,000 copies or larger. However, the rolls of Comparative Examples 1 and 2 could not be used as a fixing roll because of the considerable lowering of the roll hardness. The roll of Comparative Example 3 involved the trouble that when 20,000 copies were obtained, the surface fluorine resin layer separated from the silicone rubber layer.

EXAMPLES 2-4

Comparative Examples 4 and 5

To mixture A as prepared in Example 1 were added methylhydrogenpolysiloxane having an average composition of 50 mole% of $(CH_3)HSiO$ units, 45 mole% of $(CH_3)_2SiO$ units and 5 mole% of $(CH_3)_3SiO_{0.5}$ units, iron oxide (Bengara KN-320 available from Toda Ind. Co., Ltd.), a fluorine resin (Teflon 6C-J available from Mitsui Fluorochemical Co., Ltd.), and dicumyl peroxide in amounts indicated in Table 2. The mixtures were each kneaded in a three-roll mill to obtain organopolysiloxane compositions V to IX, respectively. These compositions were used to make elastomer rolls in the same manner as in Example 1. The rolls were subjected to the measurement of physical properties and also to a copying test where they were employed as fixing rolls of an electrostatic duplicator. The results are shown in Table 2b below.

TABLE 2

|  | Example | | | Comparative | |
|---|---|---|---|---|---|
|  | 2 | 3 | 4 | 4 | 5 |
| Composition No. | V | VI | VII | VIII | IX |
| Composition: | | | | | |
| Mixture A | 100 | 100 | 100 | 100 | 100 |
| Methylhydrogen-polysiloxane | 0.3 | 1 | 8 | — | 15 |
| Iron oxide | 10 | 10 | 10 | 10 | 10 |
| Fluorine resin | 2.5 | 2.5 | 2.5 | 2.5 | 2.5 |
| Dicumyl peroxide | 0.6 | 0.6 | 0.6 | 0.6 | 0.6 |
| Dry Physical Properties: | | | | | |
| Hardness (JIS) | 63 | 62 | 61 | 63 | 61 |
| Tensile strength (kg/cm$^2$) | 80 | 83 | 81 | 78 | 78 |
| Elongation (%) | 193 | 185 | 176 | 188 | 210 |
| Physical Properties After Heat Treatment: | | | | | |
| Variation in hardness (point) | −10 | −5 | −1 | −23 | +5 |
| Residual tensile strength (%) | 45 | 49 | 47 | 30 | 53 |
| Residual elongation (%) | 60 | 68 | 48 | 65 | 10 |

The rolls of Examples 2 and 3 passed a 100,000 or more copying test and the roll of Example 4 deformed at the 80,000th copying cycle but passed a 50,000 copying test. On the contrary, the roll of Comparative Example 4 could not be used as a fixing roll because of the considerable lowering of the roll hardness. The roll of Comparative Example 5 suffered breakage at the 1,000th copying cycle.

What is claimed is:

1. An elastomer roll comprises a roll core, a first layer formed on the roll core, and a second thin layer of a fluorine resin formed on the first layer, said first layer comprised of a cured product of an organopolysiloxane composition which comprises: (1) 100 parts by weight of an organopolysiloxane having the following general average unit formula $R_aSiO_{(4-a)/2}$ in which each R is an unsubstituted or substituted hydrocarbon group, and a is a positive value of from 1.90 to 2.05; (2) from 5 to 300 parts by weight of a finely divided silica filler; (3) from 0.05 to 10 parts by weight of an organosilicon compound having at least one hydrogen atom bonded to the silicon atom in one molecule; (4) from 5 to 100 parts by weight of iron oxide; (5) from 0.5 to 100 parts by weight of a fluorine resin; and from 0.1 to 10 parts by weight of an organic peroxide for curing the composition.

2. An elastomer roll according to claim 1, wherein each R is an alkyl group.

3. An elastomer roll according to claim 1, wherein said organopolysiloxane has a trioganosilyl group or a hydroxyl group at both ends thereof.

4. An elastomer roll according to claim 1, wherein said organopolysiloxane has a viscosity not less than 300 centistokes at 25° C.

5. An elastomer roll according to claim 1, wherein said silica filler has a specific surface area of not less than 1 m2/g and is used in an amount of from 20 to 250 parts by weight.

6. An elastomer roll according to claim 1, wherein said iron oxide is in the form of a powder having a size of not larger than 50 micrometers.

7. An elastomer roll according to claim 1, wherein said cured product is wound about the roll substrate in a thickness of from 0.3 to 20 mm.

8. An elastomer roll according to claim 1, wherein said first layer has a JIS hardness of from 40 to 75, a tensile strength of not less than 4 kgf/cm2, and an elongation of from 100 to 300%.

9. An elastomer roll according to claim 1, wherein said second layer is formed by application of a powder, paste or dispersion of a fluorine resin and thermal treatment at a temperature of from 300 to 400° C.

* * * * *